United States Patent Office 3,472,099
Patented Oct. 14, 1969

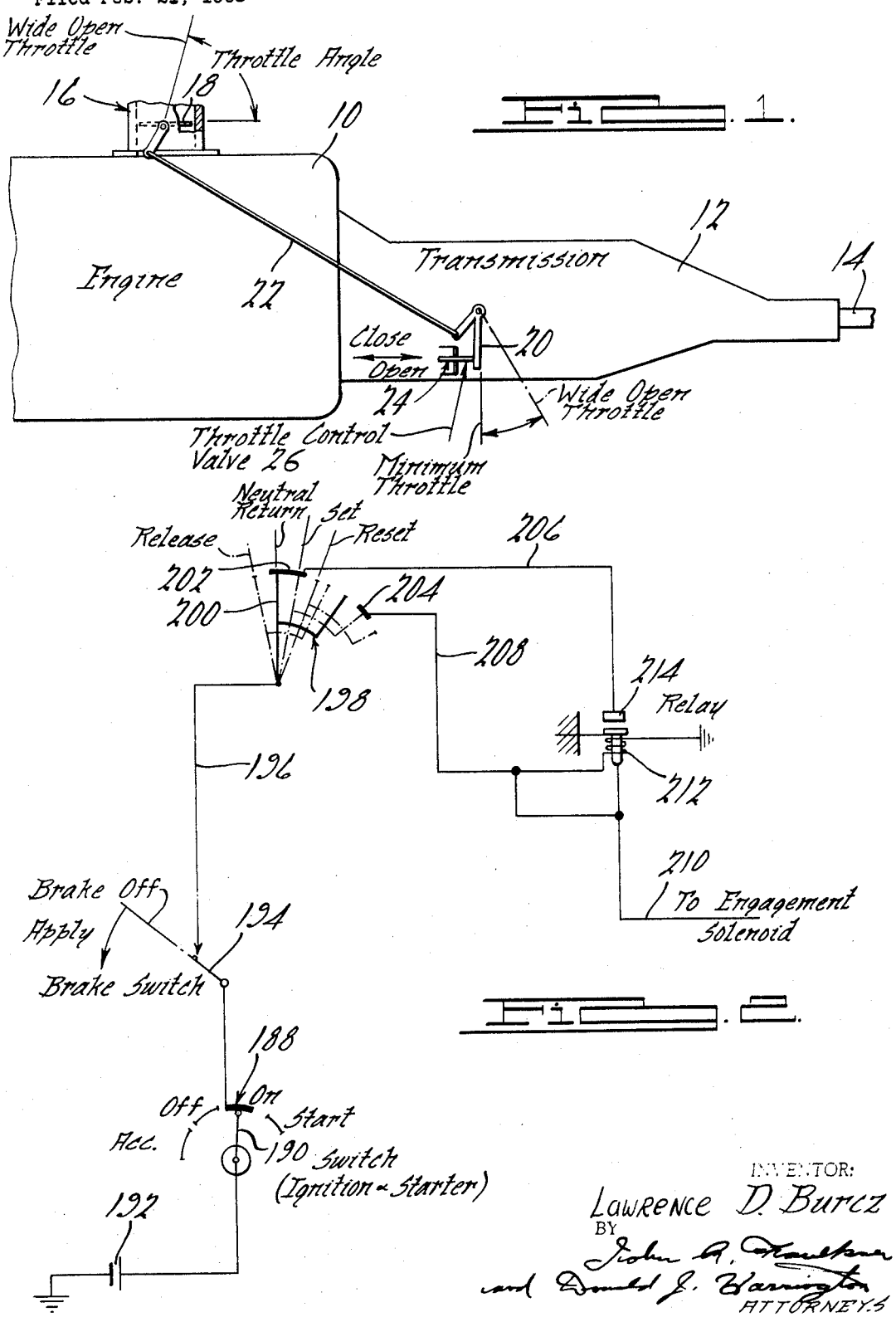

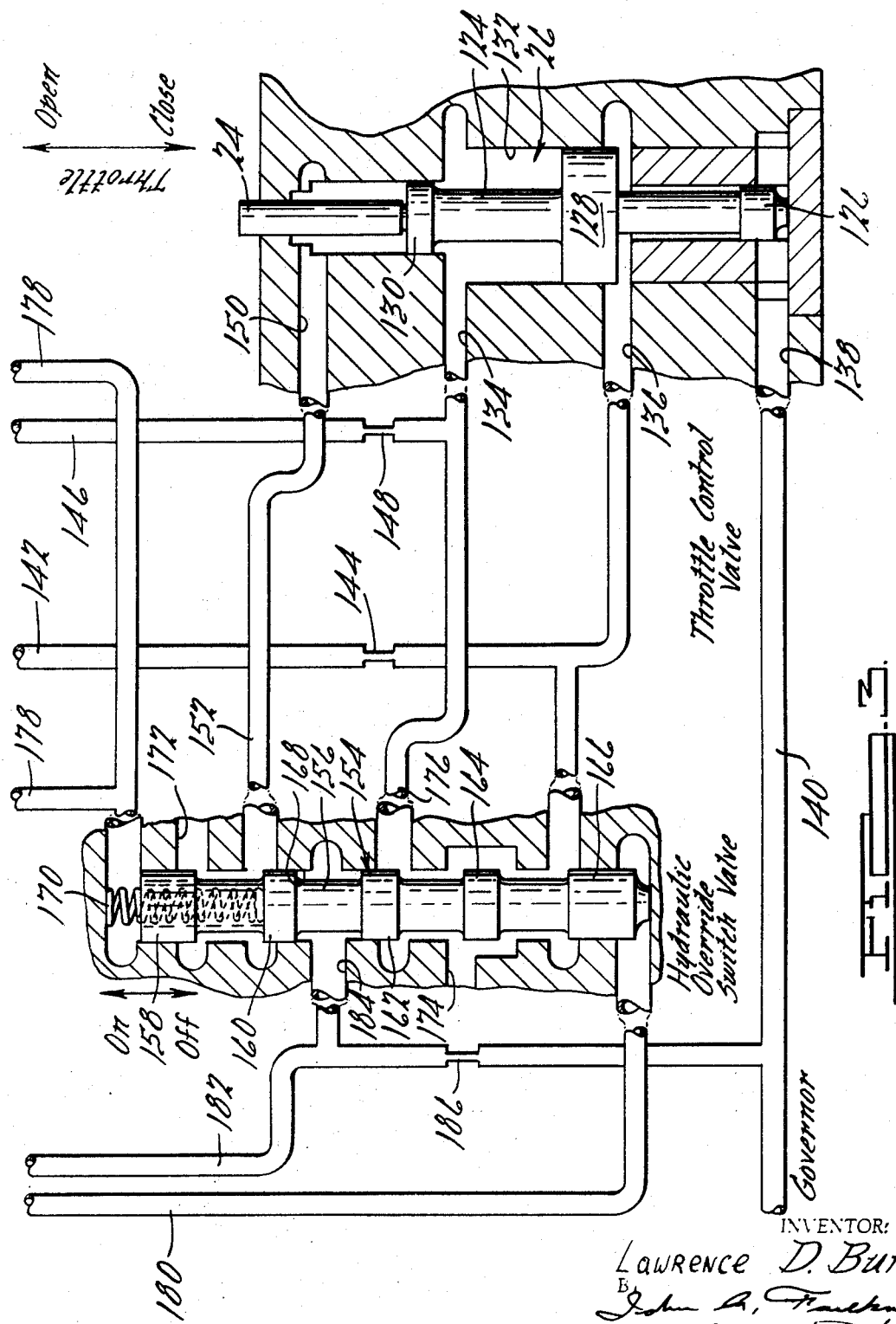

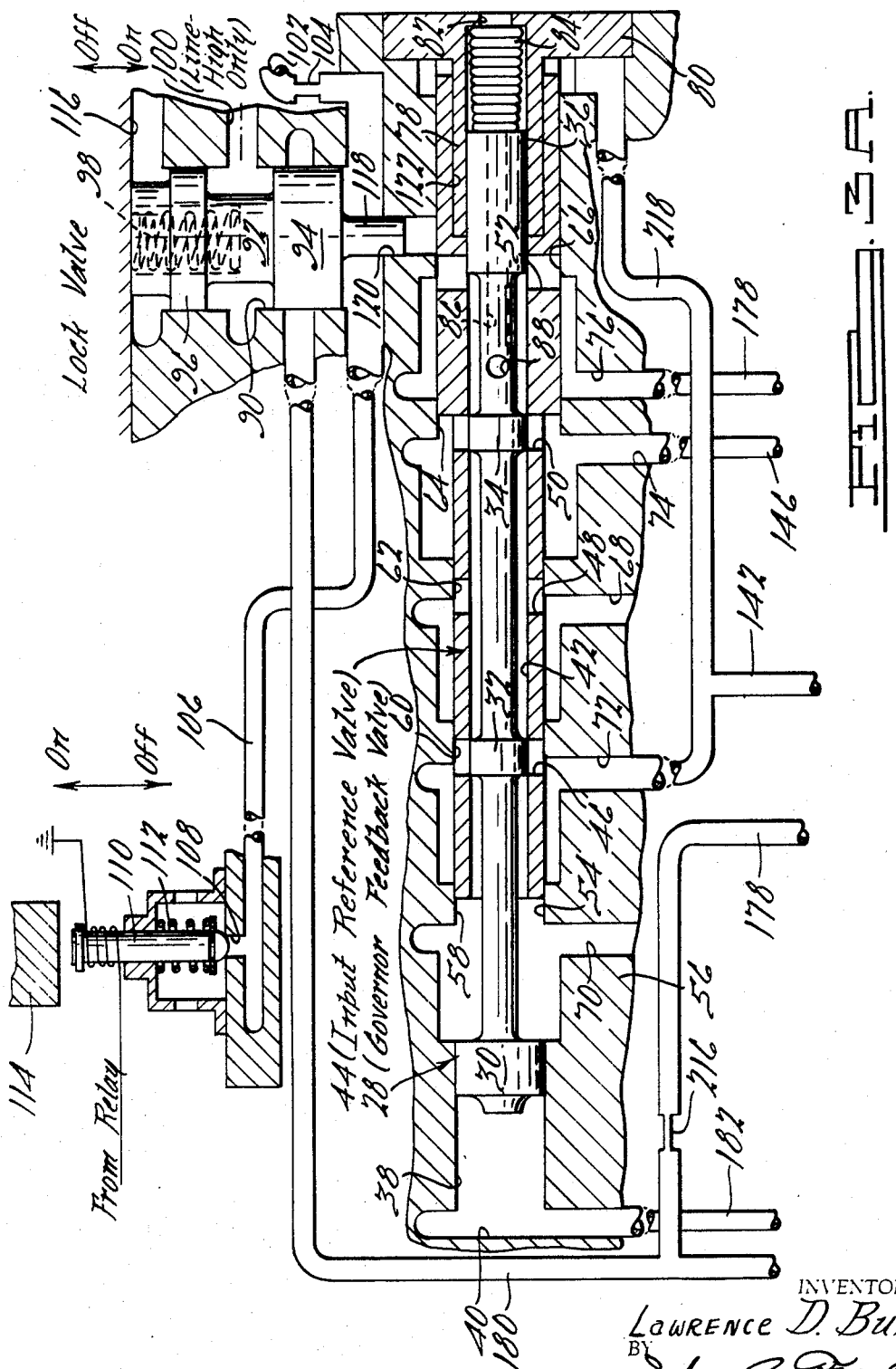

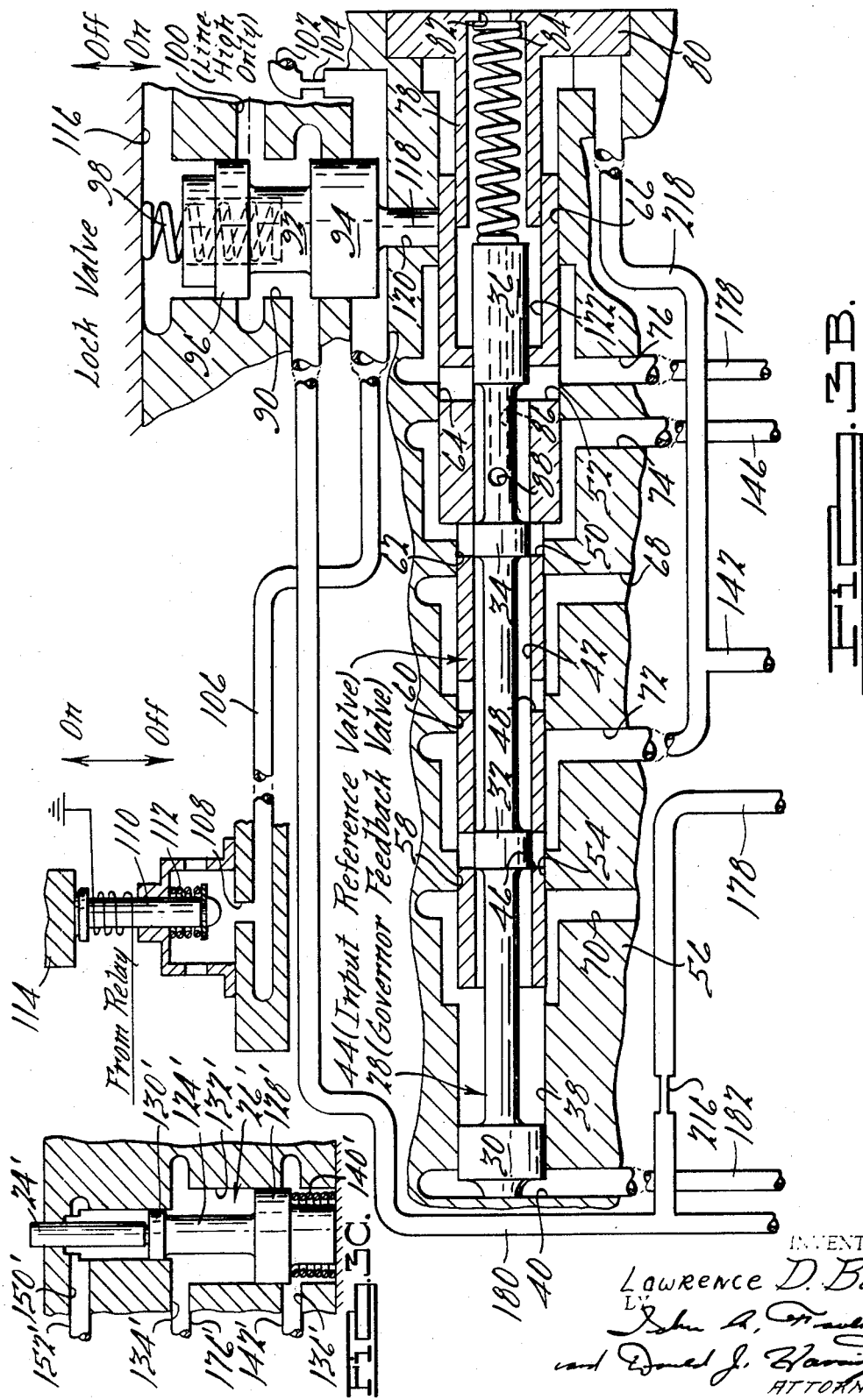

3,472,099
AUTOMATIC SPEED CONTROL FOR AN AUTOMOTIVE VEHICLE WITH A TRANSMISSION GOVERNOR FEEDBACK CIRCUIT
Lawrence D. Burcz, Detroit, Mich., assignor to Ford Motor Company, Dearborn, Mich., a corporation of Delaware
Filed Feb. 21, 1968, Ser. No. 707,197
Int. Cl. F02d 9/00, 31/00
U.S. Cl. 74—859                    10 Claims

ABSTRACT OF THE DISCLOSURE

An automatic speed control for an automotive vehicle driveline that is adapted to change the engine carburetor throttle setting in response to a governor pressure signal obtained from the vehicle transmission governor valve assembly, whereby a constant road speed is maintained regardless of changes in road load.

GENERAL DESCRIPTION OF THE INVENTION

The automatic speed control comprises a pair of relatively movable valve elements that control distribution of pressure to an engine throttle control valve, the latter being connected mechanically to the engine carburetor throttle. One of the automatic speed control valves is hydraulically connected to the transmission tailshaft driven governor when the transmission is conditioned for high speed ratio operation. This drive ratio is obtained by appropriately positioning a transmission manual valve in a so-called automatic drive range position. When it is so positioned, the transmission control system is capable of shifting the ratio changing clutch and brake servos in the transmission from one ratio to another automatically in response to changing operating variables, such as road speed and engine intake manifold pressure. The automatic speed control is rendered inactive whenever the manual valve is shifted to any position other than the automatic drive range position and whenever the multiple-ratio gearing is conditioned for any speed ratio in the automatic drive range other than the direct-drive, high speed ratio.

Provision may be made for establishing a so-called "lock-in" speed when the vehicle operator desires to maintain a constant speed. The level of the "lock-in" speed can be changed as desired.

The automatic speed control valves have a high rate of response to changes in governor pressure thereby avoiding inherent delays due to the inertia of the engine. Provision is made for overruling the personally operable elements of the automatic speed control by vehicle wheel brake pressure to permit the vehicle to decelerate during emergency conditions without an opposing engine torque.

The lock-in speed maintained by the automatic speed control valves may be chosen by the vehicle operator by initiating a simple control function such as the closing of a solenoid circuit or by triggering a switch valve that is connected hydraulically to the automatic speed control valve elements.

The speed control valves include an input reference valve arranged telescopically with respect to a so-called governor feedback valve. Both of these valves have valve lands which register, one with the other, in a preselected fashion. The governor feedback valve is connected hydraulically to the transmission tailshaft driven governor so that it is sensitive to changes in vehicle speed whenever the multiple ratio tarnsmission system is conditioned for high speed ratio operation.

The input reference valve has no function when the automatic speed control is inactive. Provision is made, however, for locking the input reference valve in a pre- established position whenever automatic speed control is desired by the operator. This occurs at any vehicle speed that is chosen by the operator. Thereafter the input reference valve and the governor feedback valve cooperate to distribute control pressure to a throttle control valve, which either increases or decreases the engine carburetor throttle setting depending upon the direction of change in governor pressure acting on the governor feedback valve.

The action of the throttle control valve can be overruled by a hydraulic override switch valve, which either assumes a throttle control valve adjusting position or a position that will establish fluid communication between the throttle control valve and the two automatic speed control valves.

The pressure source for the valve system is an engine-driven pump which supplies to the system a control pressure that is distributed also to the clutch and brake servos for the automatic transmission system. This same control pressure is used to deactivate the switch valve in the event of a malfunction in the driver-controlled actuating valves whenever working pressure is applied to the wheel brakes. The presence of wheel brake pressure is sensed by the transmission governor since a reduction in vehicle speed is accompanied by a reduction in the transmission output shaft speed.

The throttle control valve is connected mechanically to the engine carburetor throttle valve although it is situated independently of the usual engine carburetor throttle linkage system.

The throttle control valve that is used for adjusting the position of the engine carburetor throttle will trigger a response of the input reference valve in anticipation of a change in the engine speed due to a change in engine throttle position. In this way engine inertia influences on the rate of response of the automatic speed control are eliminated.

BRIEF DESCRIPTION OF THE FIGURES OF THE DRAWING

FIGURE 1 shows in schematic form an engine and transmission assembly for an automatic vehicle driveline. The transmission linkage system and the engine throttle adjusting mechanism are adapted to accommodate the improvement of my invention.

FIGURE 2 shows in schematic form an electrical circuit for deactivating and actuating the speed control elements.

FIGURES 3, 3A and 3B show in schematic form a control valve circuit capable of accomplishing speed control functions.

PARTICULAR DESCRIPTION OF THE INVENTION

My invention is adapted especially to be used in the control circuit of an automatic power transmission mechanism such as that disclosed in U.S. Patent No. 3,095,755 (Duffy), which is assigned to the assignee of my instant invention. Transmission control systems of the type shown in the Duffy patent include an engine-driven, positive displacement, fluid pressure pump which establishes a control pressure for the automatic control valve system. The control valve system includes fluid pressure operated clutches and brakes which control the relative motion of relatively movable gear elements thereby establishing automatic ratio changes to meet varying operating requirements. The automatic shift control functions are accomplished in response to changes in operating signals such as engine manifold vacuum or road speed, the latter being measured by a fluid pressure governor that is driven by the transmission power output shaft. The automatic ratio changing function of the control circuit can be overruled by a driver-controlled downshift valve, which is connected mechanically to the engine carburetor throttle through a mechanical linkage.

Distribution of pressure from the pump to the ratio changing valve elements is controlled by a driver-operated manual valve. When the manual valve assumes one position, a first mode of operation is achieved which would include automatic ratio changes between an intermediate speed ratio and a direct-drive, high speed ratio. When the manual valve is shifted to condition the valve system for any mode of operation other than the fully automatic drive range mode, control pressure distribution to the automatic speed control device of my invention is interrupted.

The transmission governor valve mechanism that supplies the automatic transmission control valve system with a vehicle speed sensor pressure acts also upon the automatic speed control of my invention to produce an appropriate correction in engine carburetor throttle setting which tends to restore the vehicle speed to a preselected value following a variation in vehicle speed upon a change in road load. The engine carburetor throttle is actuated by a throttle control valve in the automatic speed control either to advance or to retard the carburetor throttle following a response of a so-called governor feedback valve.

The feedback valve cooperates with an input reference or memory valve, the position of which is determined by the choice of a speed by the vehicle operator. A tendency for the governor feedback valve to shift with respect to the reference valve will result in a distribution of a signal to the throttle control valve thereby causing an appropriate adjustment in the carburetor throttle.

By means of a governor feedback circuit, the change in vehicle speed that results from the change in engine throttle is sensed by the governor feedback valve. The feedback valve then tends to shift to its original position with respect to the reference valve.

Another characteristic of the invention is the response feature in the governor feedback circuit. The governor feedback valve responds to a change in engine speed following a correction in the setting of the engine carburetor throttle valve. This response, however, is anticipated by a secondary feedback circuit which includes a direct, closed, hydraulic pressure distributing passage between the movable throttle control valve and a pressure chamber in the governor feedback valve. Movement of the throttle control valve will displace the fluid which will result in fluid flow between the throttle control valve and the feedback valve pressure chamber which causes the feedback valve to respond quickly to movement of the throttle control valve without the usual response delay that would be present due to the existence of engine inertia.

The automatic speed control function is overruled when the vehicle operator applies the vehicle brakes. The operator also can overrule the action of the automatic speed control when acceleration is desired. This is done by locating the throttle control valve and its associated throttle actuating linkage so that it is independent of the driver-operated throttle linkage.

In FIGURE 1 the engine is designated generally by reference character 10. Bolted to the engine block is a multiple-ratio, geared, transmission mechanism 12 which establishes a driving connection between the crankshaft of the engine 10 and the transmission output shaft 14. The engine 10 includes a carburetor 16 having a throttle valve 18 which controls the flow of a combustible air-fuel mixture into the engine intake manifold system.

The transmission 12 includes a housing on which is pivoted a lever 20. One arm of the lever 20 is connected mechanically to the engine carburetor throttle through a link element 22. The other arm of the lever 20 is adapted to be engaged by a stem 24 of a throttle control valve indicated generally by reference character 26. This valve forms a part of my improved automatic speed control.

As the stem 24 is moved in a right-hand direction by the throttle control valve, the carburetor throttle is moved to an open position. Conversely, left-hand movement of the stem 24 will permit its disengagement from lever 20. The carburetor throttle 18 then will be adjusted to the closed throttle position under the influence of the usual carburetor throttle linkage spring.

The driver-operated throttle linkage is independent of that shown in FIGURE 1. The governor feedback valve is identified by reference character 28. It includes multiple valve lands 30, 32, 34 and 36. Land 30 is slidably situated in a valve chamber 38 and it cooperates therewith to define a governor pressure feedback chamber 40.

Lands 32, 34 and 36 are of equal diameters. They are slidably situated in a valve opening 42 in an input reference sleeve valve 44. This valve is provided with spaced valve ports 46, 48, 50 and 52. Sleeve valve 44 is mounted slidably in valve chamber 54 formed in a valve body 56. Valve chamber 54 includes a series of valve lands shown at 58, 60, 62, 64 and 66. The portion of the chamber 54 in which lands 64 and 66 are formed is of larger diameter than the other portion.

Control pressure is distributed to the valve chamber at a location intermediate lands 60 and 62 through a line pressure port 68. An exhaust 70 communicates with the chamber 54 at a location intermediate the land 58 and the land 30 on the valve 28.

Pressure distributor ports 72, 74 and 76 also are formed in the valve body 56 to establish communication with the chamber 54. Each port includes an axial elongation to establish continuous communication between port 46 and port 72, between port 48 and the port 68, between port 50 and port 74 and between port 52 and port 76. Such communication is established regardless if the axial position of the reference valve 44 with respect to the body 56. The right-hand end of the valve 44 surrounds the pilot sleeve 78 which is secured at one end thereof to an end plate 80 that is fixed to the valve body 56. Sleeve 78 is vented at one end thereof through an exhaust port 82. It encloses a valve spring 84 which acts on one end of the governor feedback valve 28.

An axially extending exhaust passage 86 is formed on the right-hand end of the feedback valve 28. It communicates with exhaust port 82 at its right-hand end and it communicates with the radial port 88 at its left-hand end. Port 88 is located between lands 34 and 36.

Valve body 56 is formed also with a valve chamber 90 having a geometric axis that is transverse with respect to the axis of valve chamber 54. Valve chamber 90 encloses a lock valve comprising a movable valve element 92 which is formed with spaced valve lands 94 and 96. Element 92 is urged in a downward direction by valve spring 98. A line pressure passage 100, which communicates with the transmission manual valve described earlier, is connected to the chamber 90 at a location intermediate lands 94 and 96. Passage 100 is pressurized whenever the manual valve is in the automatic drive range position and the high speed ratio clutch is applied. A second line pressure passage 102 communicates with the lower end of the valve chamber 90 through a flow-restricting orifice 104. The pressure on the downstream side of the orifice 104 acts on the lower side of the land 94. Passage 102 communicates also with an exhaust passage 106 which extends to exhaust port 108. This port can be opened and closed by a solenoid operated valve element 110, which is adapted to register with the port 108 and seal the latter under the influence of valve spring 112. Valve element 110 is actuated in an upward direction, as viewed in the drawing, by a solenoid 114. When the solenoid is applied, valve element 110 moves away from the orifice 108, thereby exhausting passage 106.

The upper end of the valve chamber 90 is exhausted through an exhaust port 116. The lower end of the valve element 92 is formed with a stem 118 which is received slidably within an opening 120 intersecting the chamber 54. When the valve element 92 is moved in a downward direction under the influence of spring 98, the reference valve 44 is locked in place so that it cannot shift axially. When the valve element 92 is moved upwardly against the force of spring 98, however, the valve 44 can shift within the chamber 54 and follow the motion of the feedback valve 28. Valve 44 is formed with a circular opening 122 with which the pilot sleeve 78 is adapted to register. The sleeve 78 and the opening 122 establish an effective fluid seal.

The throttle control valve 26 comprises a valve spool 124 which has formed thereon three spaced valve lands 126, 128 and 130. These are situated in a valve chamber 132, the land 130 being located in a reduced diameter portion of the chamber 132.

The valve stem 24, previously described, is an extension of the valve element 124.

Land 130 is smaller than land 128. This produces a differential area which is in fluid communication with fluid pressure port 134. Land 126 is smaller in diameter than land 128, thus producing another differential area that is in fluid communication with port 136. The lower end of the valve chamber 132 also is formed with a reduced diameter. It communicates with governor pressure port 138. Governor pressure acts on the lower side of the land 126. Port 138 communicates with governor pressure passage 140, which extends to the transmission tailshaft driven governor.

Port 136 communicates with passage 142, which extends to port 72 through flow restricting orifice 144. Port 134 extends to port 74 through passage 146. A flow restricting orifice 148 is located in the passage 146. The upper side of land 130 communicates with port 150 which in turn communicates with passage 152.

The presence of governor pressure in the lower end of the throttle control valve chamber 132 establishes a bias on the valve element that maintains the stem 24 in an active position. I expect, however, that in some environments a spring may be used instead of the rateless governor pressure force supplied by the governor pressure in passage 140 to accomplish this tolerance take-up function in the throttle linkage.

A hydraulic override switch valve 154 is adapted to control the establishment and disestablishment of communication between the exhaust region and the various pressure areas on the throttle control valve. The switch valve comprises a multiple land valve element 156 having formed thereon spaced lands of equal diameter, as seen at 158, 160, 162, 164 and 166. These register with internal valve lands formed in valve chamber 168. The valve element 156 is urged in a downward direction by valve spring 170. Two exhaust ports 172 and 174 communicate with the chamber 168 at spaced locations. The valve element 156 establishes and disestablishes communication between these exhaust ports and each of the passages 152, 142 and 176, the latter communicating with port 134 in the throttle control valve 26.

Valve element 156 establishes and disestablishes also a connection between passage 178 and port 172. Passage 178 extends between port 76 and the valve body for the input reference valve and passage 180 which communicates with valve chamber for the lock valve. Passage 180 communicates also with the lower end of the switch valve, thereby establishing a pressure force under certain driving conditions on the valve element 156 which opposes the force of spring 170.

Governor pressure in passage 140 is distributed to valve chamber 40 through governor pressure passage 182. The governor pressure in passage 182 is distributed also to the switch valve chamber 168 through governor pressure port 184. A fixed, precalibrated orifice 186 is located in the passage 182.

In FIGURE 2 I have shown the circuit for the engagement solenoid. It includes ignition-starter switch 188 having a key-operated switch element 190 which can be adjusted manually between the "off" position and the "on" position, between the "on" position and the "start" position. When the switch element 190 is at the "on" position, as shown at FIGURE 2, an electrical connection is established between the vehicle ignition system battery 192 and one terminal of a brake switch 194. When the vehicle wheel brakes are applied, the switch 194 is open. When the wheel brakes are released, however, switch 194 establishes a connection between the "on" terminal of ignition switch 188 and electric line 196.

The speed control switch elements, which are shown at 198, include an armature 200 and two terminals 202 and 204. When the armature is positioned in the so-called "neutral return" position shown in FIGURE 2, line 196, which is connected to the armature 200, is connected to line 206. When the armature 200 is moved to the so-called "set" position, an electric connection is established between line 196 and terminal 204 as well as between line 196 and terminal 202. Terminal 204 is connected to electric line 208. When the armature 200 moves to the so-called "reset" position the connections between the terminals 202 and 204 and line 196 are interrupted.

Line 208 is connected directly to the engagement solenoid through line 210. A parallel bypass circuit is provided for a relay coil 212. One side of the coil is connected to line 208 and the other side is grounded to the ground side of the battery 192. An armature 214 for the relay is connected to line 206. Thus when the coil 212 is energized, an electric connection is established between line 206 and line 210.

The solenoid circuit is interrupted whenever the ignition switch is moved to the "off" position. It is interrupted also whenever the brake pedal is applied to open switch 194.

If we assume that the brake switch is closed and the ignition is on, a connection is established between armature 200 and line 206. A complete circuit to the solenoid is not established, however, since the relay 212 is not energized at that time. To energize the solenoid and to set the automatic speed control, the armature 200 is moved to the set position. At that time a direct connection is established between the armature 200 and line 208, which energizes the relay. At the same time a connection is established between line 206 and line 210 through the relay switch. The operator then can allow the armature 200 of the engagement switch to return to the neutral position shown in FIGURE 2. This return takes place under the influence of spring pressure, which normally biases the armature 200 to the neutral position.

If the operator desires to set the speed control at a different level than that which is chosen initially, he may move the armature 200 to the reset position. This again interrupts the engagement solenoid until the new speed level is achieved. As the armature then passes through the set position to the return position, the relay again becomes applied to cause the engagement solenoid to become re-energized thereby establishing a new operating condition for the speed control.

By moving the armature 200 to the release position, all circuits are interrupted and the engagement solenoid is de-energized. When the operator relieves the manual pressure on the armature 200, the armature 200 will return to the neutral position, causing disengagement of the solenoid and causing the speed control to remain inactive.

Whenever the transmission manual valve is shifted to the automatic drive range position and the high speed ratio clutch is applied, line pressure is distributed to line 100. If at that time the engagement solenoid is released, the lock valve will establish communication between line 100 and line 180 through the valve chamber 90. This pressure is distributed to the lower end of the switch valve, which causes the switch valve to move to an exhaust position. Lines 152, 176 and 142 are exhausted through the switch valve. The pressure acting on the lower end of the throttle control valve land 128 and on the upper end of the throttle control valve 130 are exhausted. Further, the pressure acting on the differential area of lands 128 and 130 is exhausted. A residual pressure remains in passage 140, which acts on the lower end of the land 126 to maintain a constant bias on the throttle control valve element 124.

When the operator closes the relay circuit, the relay valve element 110 is moved in an upward direction to open the orifice 108. This exhausts the pressure acting on the lower side of the lock valve land 94. That land normally is pressurized by the pressure that is supplied by the passage 102 across orifice 104. When the relay is energized, however, the pressure on the downstream side of the orifice 104 is exhausted through the port 108 and the valve element 92 is urged in a downward direction by the valve spring 98. As it moves downwardly, the stem 118 engages the valve sleeve 44 and locks it in place within the valve opening.

If we now assume that the operator has adjusted the engine carburetor throttle so that the vehicle speed is at a desired level, the relay may be energized thereby causing the lock valve to lock the reference valve 44 in a given position. At that time if the high speed ratio clutch is applied, line pressure will be distributed from passage 100 to the passage 180 through the lock valve. This pressure will cause the switch valve to move in an upward direction thereby blocking the exhaust ports for the throttle control valve. Governor pressure in passage 140 passes through orifice 186 and acts on the left-hand side of the inner governor feedback valve 28. The governor pressure thus produced opposes the spring force of spring 84. The same governor pressure acts on the valve 28 also at a time prior to the engagement of the lock valve. Thus the position of the valve element 28 does not change immediately following engagement of the lock valve. If the vehicle speed should change following movement of the lock valve to the locking position, however, the valve element 28 will shift in one direction or the other depending upon whether the vehicle speed increases or decreases. If the vehicle speed decreases, the governor pressure acting on the left-hand end of land 30 is reduced, thereby allowing the spring 84 to shift the valve element 28 in a left-hand direction relative to the reference valve 44. Line pressure, which is distributed to the reference valve chamber through port 68, then passes through port 48 and through port 46 which now becomes opened by the valve land 32. At the same time port 50 remains sealed from port 48 by the valve land 34. Thus line pressure is distributed to port 72. It then passes through line 142 to the port 136 in the throttle control valve. Passage 146 becomes exhausted through port 74, port 50 and the radial opening 88 which extends to the exhaust region through port 82. Thus the lower side of the land 128 of the throttle control valve becomes pressurized while the upper side thereof becomes exhausted. This causes the throttle control valve to move in an upward direction to cause the engine carburetor throttle to move to an advanced setting. An increase in the vehicle engine speed thus tends to occur, which in turn tends to restore the vehicle speed to the value that existed prior to the increase in road load which caused the vehicle speed to decrease in the first instance. As the vehicle speed increases, the feedback valve becomes subjected to a higher governor pressure. This tends to shift the valve 28 in a right-hand direction to its original starting position thereby progressively closing port 72 and progressively closing at the same time port 50. The pressure in passages 146 and 142 now tend to become balanced once more.

If the vehicle speed should increase due to a reduction in road load, the governor pressure acting on the feedback valve 28 increases thereby causing the valve to become shifted against the force of spring 84. This will tend to open port 46 to the exhaust port 70, and at the same time open line pressure port 48 to the port 50. This pressurizes passage 146 and exhausts passage 142. The throttle control valve again becomes unbalanced and the stem 24 is moved toward a closed throttle position. This reduces the engine speed and vehicle speed follows. As the vehicle speed decreases to the original lock-in speed for the speed control, the valve 28 again is shifted in a left-hand direction thereby decreasing the communication between passage 142 and the exhaust region and decreasing the degree of communication between pressurized passage 146 and the line pressure port 68.

If the vehicle speed should decrease, it is desirable to cause the speed control to respond quickly without the necessity for waiting for an engine response. The engine response, of necessity, is delayed because of the engine inertia forces. Such a quick response is obtained by the closed circuit connection between port 150 and the chamber 40. As the throttle control valve 124 is moved toward a closed throttle position, the land 130 moves in a downward direction thereby increasing the volume of the space in the valve chamber defined by the land 130. This draws fluid from passage 150, thereby creating instantaneously a reduction in pressure in passage 152. This instantaneous reduction in pressure is transferred from passage 152 to port 184 through the switch valve. The reduction in pressure then is transferred through passage 182 to the left-hand side of the feedback valve land 30. Immediately the feedback valve responds to the shifting movement of the throttle control valve before the response of the engine is felt by the speed control.

The orifice 186 allows this instantaneous response to occur since the orifice establishes a semi-isolated condition at this time. It is possible to obtain an instantaneous reduction in the pressure chamber 40 because of the flow restriction offered by the orifice 186.

If the throttle control valve 124 is shifted in an upward direction, as viewed in FIGURE 3, toward an open throttle position upon a decrease in road speed, fluid is displaced by the throttle control valve through port 150 and through passage 152. This creates an increase in pressure in passage 152 which is distributed through the switch valve to passage 182 and to the chamber 40. This increase in pressure is instantaneous, and it is made possible by the presence of the orifice 186. This instantaneous increase in pressure causes an immediate response of the feedback valve so that the original lock-in speed in restored quicker than the restoration rate that would be possible if the response of the engine were to be relied upon.

If the vehicle operator applies the brakes, switch 194 becomes opened. If for some reason the switch valve does not respond to this by moving in a downward direction, it is possible for the switch valve to be forced in that direction as the vehicle speed decreases due to the braking effort of the wheel brakes. This occurs in the following fashion: As the vehicle decelerates, the governor pressure acting on the left-hand side of land 30 decreases. This tends to cause valve element 28 to shift relative to valve element 44, as explained previously. If it is assumed that, for some reason, the sleeve valve 44 is not released (e.g., due to a malfunction of some sort) after the vehicle speed decreases to a sufficient value, port 52 will be closed by land 36. This interrupts the communication between passage 178 and the exhaust region through the opening 88 and through the port 82. This then will cause a pressure build-up in passage 178 as pressure is distributed to that passage through flow restricting orifice 216 located in passage 178. The pressure build-up will act on the upper end of land 158 thereby forcing shift valve 154 in a downward direction to exhaust the operating area for the throttle control valve. The speed control thus is rendered inactive, and the vehicle operator again has complete control of the vehicle.

When the vehicle operator subsequently accelerates the vehicle beyond the point at which port 52 became covered by land 36, the automatic lock-in speed again will be achieved. The difference in road speed between the so-called lock-in speed and the speed at which port 52 becomes covered may be as little as 5 to 7 miles per hour.

Whenever the automatic speed control is inactive and the lock valve is in an upward position, the input reference valve simply will follow the motion of the feed-back valve as the latter shifts in the valve body due to changing values of the governor pressure. If the governor pressure should decrease, for example, the valve 28 will shift in a left-hand direction. This will tend to distribute line pressure from port 68 to passage 218, which extends to the right-hand side of the valve 44 where it acts on the reduced effective area. This area, incidentally, is sealed from the exhaust region by the sleeve 78.

If the vehicle speed should increase while the speed control is inactive, the resulting shifting movement of the valve element 28 in a right-hand direction will tend to increase the communication between passage 218 and the exhaust port 70 through the port 46. At the same time port 50 becomes uncovered thereby creating a pressure force on the reference valve due to the differential area that is measured by the difference in diameter of the land 64 and 62. Thus the outer valve will shift in a right-hand direction as it follows the movement of the inner valve.

I expect that the reference valve may be made in the form of a spool valve, and that the feedback valve may be made in the form of a sleeve valve if desired. In the present embodiment, however, I have chosen to arrange the feedback valve concentrically within the reference value, although I do not intend to restrict the scope of my invention to this precise construction.

Having thus described a preferred form of my invention, what I claim and desire to secure by U.S. Letters Patent is:

1. An automatic speed control for use in an automotive vehicle driveline comprising a throttle controlled engine and a transmission driven shaft, the latter being drivably connected to vehicle wheels, a throttle actuator comprising a fluid pressure movable member with pressure means thereon and a mechanical connection between said member and the engine throttle, a governor feedback valve, a reference valve, each valve comprising a movable valve element, valve lands formed on one valve element registering with cooperating valve lands on the other valve element, both valve elements being situated in a common valve chamber, a pressure port adapted to supply said valve chamber with control pressure, a first conduit extending from said valve chamber to one pressure area on said throttle control valve actuator, a second conduit extending from said chamber to a second area on said actuator, a source of a fluid pressure signal that is proportional in magnitude to the driven speed of said driven shaft, a governor pressure passage extending from said signal source to a governor pressure area on said feedback valve whereby the latter is biased in one direction under the influence of said signal, the pressure in one of said conduits being increased and the pressure in the other of said conduits being decreased upon shifting movement of said feedback valve in one direction with respect to said reference valve, the relative pressure distribution being reversed in said conduits upon shifting movement of said feedback valve in the opposite direction with respect to said reference valve, a driver-controlled lock valve means for fixing in a predetermined position said reference valve with respect to said chamber thereby permitting relative displacement between said valves to occur upon a change in the magnitude of said signal.

2. An automatic speed control for use in an automotive vehicle driveline comprising a throttle controlled engine and a transmission driven shaft, the latter being drivably connected to vehicle wheels, a throttle actuator comprising a fluid pressure movable member with pressure means thereon and a mechanical connection between said member and the engine throttle, a governor feedback valve, a reference valve, each valve comprising a movable valve element, valve lands formed on one valve element registering with cooperating valve lands on the other valve element, both valve elements being situated in a common valve chamber, a pressure port adapted to supply said valve chamber with control pressure, a first conduit extending from said valve chamber to one pressure area on said throttle control valve actuator, a second conduit extending from said chamber to a second area on said actuator, a source of a fluid pressure signal that is proportional in magnitude to the driven speed of said driven shaft, a governor pressure passage extending from said signal source to a governor pressure area on said feedback valve whereby the latter is biased in one direction under the influence of said signal, the pressure in one of said conduits being increased and the pressure in the other of said conduits being decreased upon shifting movement of the feedback valve in one direction with respect to said reference valve, the relative pressure distribution being reversed in said conduits upon shifting movement of said feedback valve in the opposite direction with respect to said reference valve, a driver-controlled lock valve means for fixing in a predetermined position said reference valve with respect to said chamber thereby permitting relative displacement between said valves to occur upon a change in the magnitude of said signal, a separate exhaust passage communicating with each of said first and second conduits, a hydraulic override switch valve situated in and partly defining said exhaust passages, said switch valve having two operating positions, said exhaust passages being opened when said switch valve assumes one position and being closed when it assumes a second position, a line pressure passage extending from a high pressure region of said system to said lock valve means, a branch passage extending from said lock valve means to said switch valve, said lock valve means establishing communication between said line pressure passage and said branch passage when said lock valve means is in a blocking position thereby shifting said switch valve to an exhaust port closing position, and means for biasing said switch valve to the exhaust port opening position when said lock valve means is in the release position as it interrupts communication between said line pressure passage and said branch passage.

3. The combination as set forth in claim 1 wherein said throttle actuator includes a movable valve land, a fluid chamber defined in part by said movable valve land, and a feedback passage connecting said fluid chamber with said feedback valve chamber whereby shifting movement of said throttle actuator to a closed throttle position will result in a transient decrease in the effective pressure signal acting on said feedback valve to create an immediate response of said actuator to a decrease in road speed, said feedback passage being subjected to an instantaneous increase in pressure by displacement of fluid from said fluid chamber upon movement of said actuator to an open throttle position thereby causing an intermediate response of said feedback valve to an increase in vehicle speed.

4. The combination as set forth in claim 2 wherein said throttle actuator includes a movable valve land, a fluid chamber defined in part by said movable valve land, and a feedback passage connecting said fluid chamber with said feedback valve chamber whereby shifting movement of said throttle actuator to a closed throttle position will result in a transient decrease in the effective pressure signal acting on said feedback valve to create an immediate response of said actuator to a decrease in road speed, said feedback passage being subjected to an instantaneous increase in pressure by displacement of fluid from said fluid chamber upon movement of said actuator to an open throttle position thereby causing an intermediate response of said feedback valve to an increase in vehicle speed.

5. The combination as set forth in claim 2 wherein one exhaust port is defined in part by relative movable valve lands on said reference valve and said feedback valve, a fluid connection between said exhaust port and one side of said switch valve, said fluid connection being in restricted communication with a high pressure region of said system, said feedback valve shifting relative to said reference valve during deceleration of said vehicle whereby said exhaust port is closed to create a pressure buildup in said fluid connection thereby shifting said switch valve to an open exhaust position to override the influence of said throttle actuator.

6. The combination as set forth in claim 1 wherein said driveline includes a high speed-ratio fluid pressure operated clutch, a line pressure passage communicating with said high speed ratio clutch whereby said lock valve is supplied with fluid pressure during operation in the high speed ratio and is denied a supply of fluid pressure during operation in other ratios, an exhaust port communicating with said lock valve adjacent one pressure area thereof, means for supplying a control pressure to said one area, and a driver-controlled valve element movable into and out of registry with respect to said exhaust port thereby exhausting selectively said one area to control the actuation and release of said lock valve.

7. The combination as set forth in claim 2 wherein said driveline includes a high speed ratio fluid pressure operated clutch, a line pressure passage communicating with said high speed ratio clutch whereby said lock valve is supplied with fluid pressure during operation in the high speed ratio and is denied a supply of fluid pressure during operation in other ratios, an exhaust port communicating with said lock valve adjacent one pressure area thereof, means for supplying a control pressure to said one area, and a driver-controlled valve element movable into and out of registry with respect to said exhaust port thereby exhausting selectively said one area to control the actuation and release of said lock valve.

8. The combination as set forth in claim 3 wherein said driveline includes a high speed-ratio fluid pressure operated clutch, a line pressure passage communicating with said high speed ratio clutch whereby said lock valve is supplied with fluid pressure during operation in the high speed ratio and is denied a supply of fluid pressure during operation in other ratios, an exhaust port communicating with said lock valve adjacent one pressure area thereof, means for supplying a control pressure to said one area, and a driver-controlled valve element movable into and out of registry with respect to said exhaust port thereby exhausting selectively said one area to control the actuation and release of said lock valve.

9. The combination as set forth in claim 4 wherein said driveline includes a high speed-ratio fluid pressure operated clutch, a line pressure passage communicating with said high speed ratio clutch whereby said lock valve is supplied with fluid pressure during operation in the high speed ratio and is denied a supply of fluid pressure during operation in other ratios, an exhaust port communicating with said lock valve adjacent one pressure area thereof, means for supplying a control pressure to said one area, and a driver-controlled valve element movable into and out of registry with respect to said exhaust port thereby exhausting selectively said one area to control the actuation and release of said lock valve.

10. The combination as set forth in claim 5 wherein said driveline includes a high speed-ratio fluid pressure operated clutch, a line pressure passage communicating with said high speed ratio clutch whereby said lock valve is supplied with fluid pressure during operation in the high speed ratio and is denied a supply of fluid pressure during operation in other ratios, an exhaust port communicating with said lock valve adjacent one pressure area thereof, means for supplying a control pressure to said one area, and a driver-controlled valve element movable into and out of registry with respect to said exhaust port thereby exhausting selectively said one area to control the actuation and release of said lock valve.

References Cited
UNITED STATES PATENTS

| | | | |
|---|---|---|---|
| 2,278,099 | 3/1942 | Bennetch | 74—859 X |
| 2,737,059 | 3/1956 | Perkins | 74—859 |
| 2,968,193 | 1/1961 | Frick | 74—859 |
| 3,360,069 | 12/1967 | Chana et al. | 74—859 X |

ARTHUR T. McKEON, Primary Examiner

U.S. Cl. X.R.

180—108